(12) United States Patent
Nakajima et al.

(10) Patent No.: US 7,536,755 B2
(45) Date of Patent: May 26, 2009

(54) CLIP HAVING ENGAGING PAWL PORTIONS AND PROJECTING PORTIONS

(75) Inventors: Takeshi Nakajima, Kanagawa (JP); Shigeo Okada, Kanagawa (JP)

(73) Assignee: Piolax, Inc., Yokohama-shi, Kanagawa (JP)

( * ) Notice: Subject to any disclaimer, the term of this patent is extended or adjusted under 35 U.S.C. 154(b) by 0 days.

(21) Appl. No.: 12/000,875

(22) Filed: Dec. 18, 2007

(65) Prior Publication Data

US 2008/0172845 A1 Jul. 24, 2008

(30) Foreign Application Priority Data

Dec. 19, 2006 (JP) ............................ P2006-341692

(51) Int. Cl.
*F16B 5/06* (2006.01)
(52) U.S. Cl. .......................................... 24/297; 24/453
(58) Field of Classification Search .................. 24/297, 24/453, 458; 403/397; 411/508–510; 52/716.7, 52/718.06, 718.03
See application file for complete search history.

(56) References Cited

U.S. PATENT DOCUMENTS 6,449,814 B1 * 9/2002 Dinsmore et al. ............. 24/297
7,231,696 B2 * 6/2007 Asano et al. .................. 24/297

FOREIGN PATENT DOCUMENTS

JP 2005-188718 7/2005

* cited by examiner

*Primary Examiner*—James R Brittain
(74) *Attorney, Agent, or Firm*—McGinn IP Law Group, PLLC (57) ABSTRACT

A clip for fixing a mounting part with a boss portion provided on and suspended perpendicularly from the back surface thereof to a panel with a mounting hole formed therein, includes: a base body having a U-shaped section and including a pair of mutually opposed side walls; a pair of elastic arms respectively extended from the inner surfaces of their associated side walls of the base; a pair of securing shoulders respectively provided on and projected from the outer surfaces of their associated side walls of the base body; engaging pawl portions engageable with an engaging portion formed in the boss portion; recessed portions provided in one of the inner surfaces of the side walls of the base body and the outer surfaces of the elastic arms corresponding to the inner surfaces of the side walls, and projecting portions provided in the other.

5 Claims, 7 Drawing Sheets

CLIP HAVING ENGAGING PAWL PORTIONS AND PROJECTING PORTIONS

BACKGROUND OF THE INVENTION

1. Field of the Invention

The present invention relates to a clip which is made of synthetic resin and is used to fix, for example, a mounting part such as a trim or a garnish provided in a car, to a car body panel using a boss portion provided on and suspended perpendicularly from the back surface of the mounting part.

2. Description of the Related Art

This type of conventional clip, although not shown specifically, is a synthetic-resin-made integral member which includes a base body having a U-shaped section and a pair of mutually opposed side walls, a pair of elastic arms respectively extended from the inner surfaces of the respective side walls of the base body, and a pair of securing shoulders respectively provided on and projected from the outer surfaces of the respective side walls of the base body. In this clip, the base body includes, in the free end edges of the respective side walls, flange portions respectively projecting outwardly; the pair of elastic arms respectively include, on the inner surfaces of the leading end portions thereof, engaging pawl portions which can be engaged with an engaging hole formed in the above-mentioned boss portion; and, the pair of engaging shoulders respectively include tapered surface portions respectively formed on the upper surfaces thereof which can be secured to the hole edge of a mounting hole opened up in the car body panel, as disclosed in JP-A-2005-188718.

And, to fix a trim to a car body panel actually, firstly, when a boss portion provided on and suspended perpendicularly from the back surface of the trim is inserted into inside the two side walls of the base body of the clip, the engaging pawl portions provided on the pair of elastic arms are respectively engaged into the engaging hole of the boss portion from both sides to thereby engage the clip with the trim provisionally; and, while keeping this state, when the boss portion is inserted into a mounting hole previously formed in the car body panel to thereby secure the tapered surface portions of the respective securing shoulders to the hole edge of the mounting hole, the trim can be fixed to the car body panel.

On the other hand, to remove the trim from the car body panel, when trying to pull out the boss portion of the trim from the mounting hole of the car body panel, the lower surface of the engaging hole of the boss portion is collided with the lower surfaces of the engaging pawl portions of the respective elastic arms and the clip itself is thereby going to be pulled out together with the boss portion; however, in this state, when the securing shoulders respectively having the tapered surface portions are inserted into the mounting hole of the car body panel, the side walls of the clip are respectively flexed on the inside thereof and thus the inner surfaces of the side walls are respectively pressed against their associated elastic arms inwardly to thereby strengthen the engaged state between the securing hole of the boss portion and the engaging pawl portions of the respective elastic arms. Therefore, finally, while the clip remains mounted on the boss portion of the trim, the boss portion of the trim can be pulled out of the mounting hole of the car body panel.

SUMMARY OF THE INVENTION

Therefore, in the conventional clip, when removing the trim from the car body panel, since there is no possibility that the clip can be left on the car body panel side, there is provided an advantage that the trim removing operation can be facilitated. However, in the above-mentioned conventional structure, it is assumed that the angles of the tapered surface portions of the securing shoulders are made closer to a right angle in order to increase the pull-out load of the clip. In this case, when trying to pull out the boss portion of the trim from the mounting hole of the car body panel, the securing shoulders are shaved off by the hole edge of the mounting hole, which makes it difficult to use the securing shoulders again; and, on the other hand, when the projecting amounts of the securing shoulders are increased without changing the angles thereof, the inserting forces of the securing shoulders with respect to the mounting hole of the car body panel become too high, which raises a fear that the efficiency of the trim removing operation can be lowered.

The present invention is developed to effectively solve the above problems found in the conventional clip. Specifically, according to a first aspect of the invention, there is provided a clip for fixing a mounting part with a boss portion provided on and suspended perpendicularly from the back surface thereof to a panel with a mounting hole formed therein, the clip including: a base body having a U-shaped section and including a pair of mutually opposed side walls; a pair of elastic arms respectively extended from the inner surfaces of their associated side walls of the base; a pair of securing shoulders respectively provided on and projected from the outer surfaces of their associated side walls of the base body, each securing shoulder having a tapered surface portion; engaging pawl portions engageable with an engaging portion formed in the boss portion, the engaging pawl portions being formed in the inner surfaces of the leading end portions of the pair of elastic arms; recessed portions provided in one of the inner surfaces of the side walls of the base body and the outer surfaces of the elastic arms corresponding to the inner surfaces of the side walls; and projecting portions provided in the other of the inner surfaces of the side walls of the base body and the outer surfaces of the elastic arms corresponding to the inner surfaces of the side walls, wherein: when the base body is inserted into the mounting hole of the panel, the recessed portions and projecting portions are not to be engaged with each other; and when the base body is pulled out from the mounting hole of the panel, the recessed portions and projecting portions are to be engaged with each other.

According to a second aspect of the invention according to the first aspect of the invention, the recessed portions and projecting portions are respectively situated in the vicinity of the engaging pawl portions of the respective elastic arms.

According to a third aspect of the invention according to the first or second aspect of the invention, each of the recessed portions is formed such that a portion thereof is left in the width direction of the side wall of the base body or the elastic arm.

According to a fourth aspect of the invention according to the third aspect of the invention, the respective recessed portions are formed such that the left portions thereof alternate each other.

According to a fifth aspect of the invention according to any one of the first to fourth aspect of the invention, the recessed portions and projecting portions overlap each other in part in a state where the mounting part is fixed to the panel.

As described above, according to the first aspect of the invention, when the base body of the clip is inserted into the mounting hole of the panel, since the recessed portions and projecting portions are not engaged with each other and thus since the flexure of the side walls of the base body is not restricted, the base body can be smoothly moved through the mounting hole, thereby being able to reduce the insertion force of the base body with respect to the mounting hole. On the other hand, when a force in the pull-out direction is applied to the clip, since the recessed portions and projecting portions are engaged with each other and thus since the flexure of the side walls of the base body is restricted, the pull-out load is set high, so that the mounting part can be fixed to the panel firmly.

Further, when the base body of the clip is pulled out from the mounting hole of the panel, the recessed portions and projecting portions are engaged with each other to thereby restrict the deformation of the elastic arms. In other words, owning to not only the engagement between the recessed portions and projecting portions but also the strong engagement between the engaging pawl portions of the elastic arms and the engaging portion of the boss portion, the clip itself will not be left on the mounting hole side of the panel but can be pulled out together with the boss portion of the mounting part.

According to the second aspect of the invention, since the recessed portions and projecting portions are respectively situated in the vicinity of the engaging pawl portions of the respective elastic arms to which the pull-out force is applied, the recessed portions and projecting portions can be engaged with each other more strongly, whereby the clip can be positively held on the boss portion side of the mounting part.

Here, when the recessed portions are formed in the width direction entire areas of the side walls of the base body or in the width direction entire areas of the elastic arms, the rigidity of the clip is lowered. This means that the thickness of the clip must be increased and thus the size of the clip must be increased. However, according to the third aspect of the invention, since each of the recessed portions is formed such that a portion thereof is left in the width direction of the side wall of the base body or the elastic arm, not only the rigidity of the recessed portion forming portion can be maintained but also the size of the clip can be reduced.

According to the fourth aspect of the invention, since the respective recessed portions are formed such that the left portions thereof alternate each other, on both sides, there can be obtained a uniform engagement state between the recessed portions and projecting portions. This makes it possible to positively hold the clip on the boss portion side of the mounting part. Also, when engaging the clip with the boss portion of the mounting part provisionally, since there can be eliminated the need to pay attention to the engaging direction of the clip, the efficiency of the engaging operation can be enhanced.

According to the fifth aspect of the invention, the recessed portions and projecting portions overlap each other in part in a state where the mounting part is fixed to the panel. Therefore, when an expected pull-out force is applied to the mounting part, or when the base body of the clip is pulled out from the mounting hole of the panel, since the recessed portions and projecting portions are guided by their partially overlapping state, they can be engaged with each other positively, whereby a high pull-out load can be secured stably all the time.

BRIEF DESCRIPTION OF THE DRAWINGS

These and other objects and advantages of this invention will become more fully apparent from the following detailed description taken with the accompanying drawings in which.

DETAILED DESCRIPTION OF THE EMBODIMENTS

According to the invention, there is provided a clip which is used to fix a mounting part with a boss portion provided on and suspended perpendicularly from the back surface thereof to a panel with a mounting hole formed therein, and also which includes: a base body having a U-shaped section and including a pair of mutually opposed side walls; a pair of elastic arms respectively extended from the inner surfaces of their associated side walls of the base; and, a pair of securing shoulders respectively provided on and projected from the outer surfaces of their associated side walls of the base body, each securing shoulder having a tapered surface portion. In the present clip, in the inner surfaces of the leading end portions of the pair of elastic arms, there are formed engaging pawl portions engageable with an engaging portion formed in the boss portion; in one of the inner surfaces of the side walls of the base body and the outer surfaces of the elastic arms corresponding to the inner surfaces of the side walls, there are formed recessed portions, and in the other, there are formed projecting portions; and, when the base body is inserted into the mounting hole of the panel, the recessed portions and projecting portions are not to be engaged with each other, and, when the base body is pulled out from the mounting hole of the panel, the recessed portions and projecting portions are to be engaged with each other. According to this structure, when the base body of the clip is inserted into the mounting hole of the panel, the insertion force can be reduced; and, when the base body of the clip is pulled out of the mounting hole of the panel, the clip is not left on the mounding hole side of the panel but can be held on the boss portion side of the mounting part.

Figure 1:
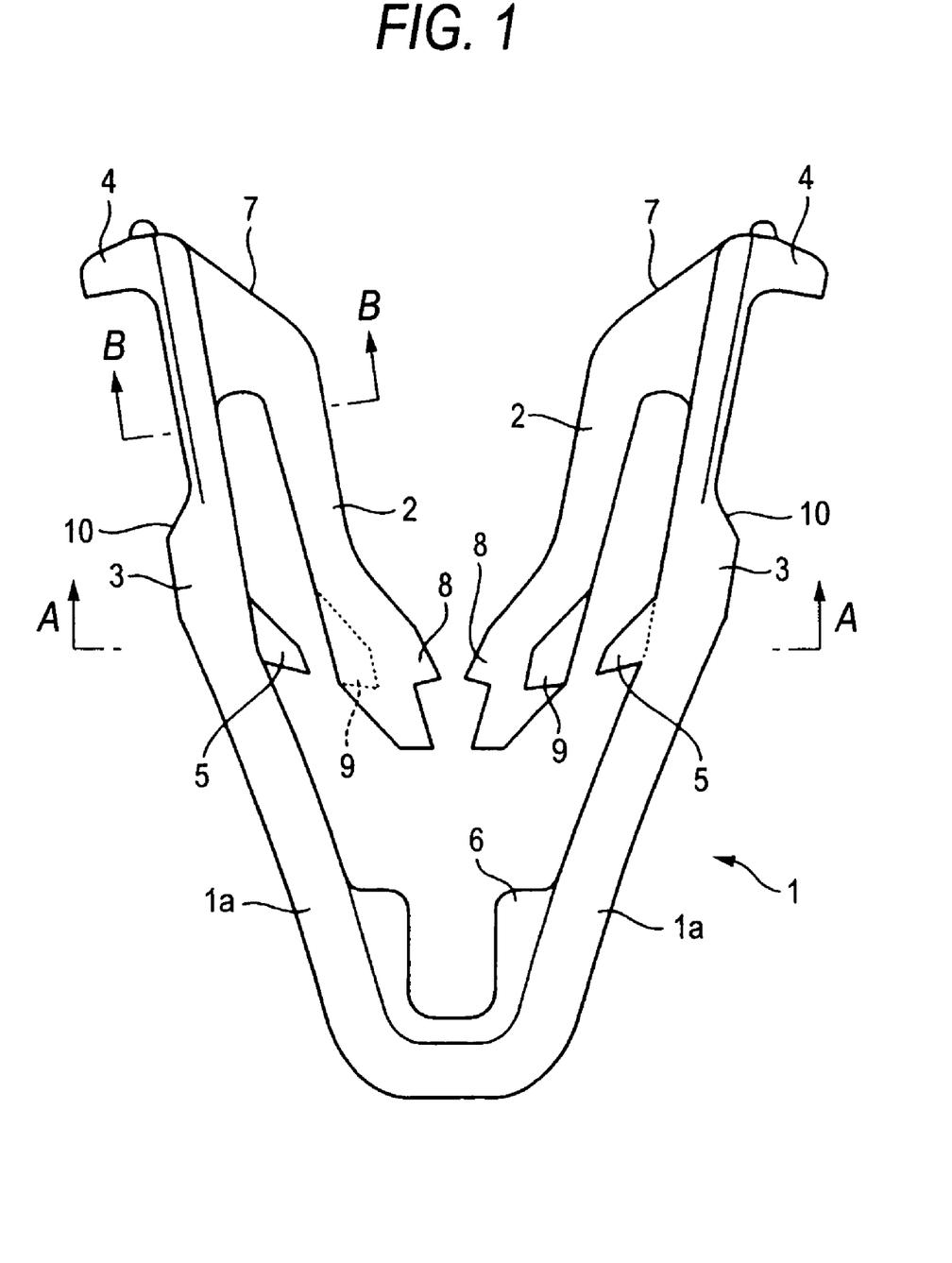
FIG. 1 is a front view of a clip according to an embodiment of the invention.

Now, description will be given below in detail of the invention with reference to a preferred embodiment of the invention shown in the accompanying drawings. A clip according to the present embodiment is also an integrally molded clip made of synthetic resin and is developed in order to fix the trim of a car to a car body panel with a mounting hole formed therein using a boss portion provided on and suspended perpendicularly from the back surface of the trim. Specifically, as shown in FIG. 1, the clip includes a base body 1 having a U-shaped section and including a pair of mutually opposed side walls 1a, a pair of elastic arms 2 respectively formed so as to extend along the side walls 1a of the base body 1 from the free end portions of the inner surfaces of their associated side walls 1a, and a pair of securing shoulders 3 respectively provided on and projected from the middle portions of the outer surfaces of the respective side walls 1a of the base body 1.

And, according to the present embodiment, with the above structure as the major premise, the base body 1 employs the following structure: that is, on the free end edges of the respective side walls 1a defining the U shape of the base body 1, there are provided two flange portions 4 which are respectively projected outwardly therefrom; on the inner surfaces of the side walls 1a respectively facing the leading end portions of the elastic arms 2, there are provided two pawl-shaped projecting portions 5 which can be respectively engaged with their associated recessed portions 9 (which will be discussed later) of the elastic arms 2; and, in the bottom portion of the base body 1, there is formed a support portion 6 which is used to support the leading end of the boss portion of the trim.

Figure 2A:
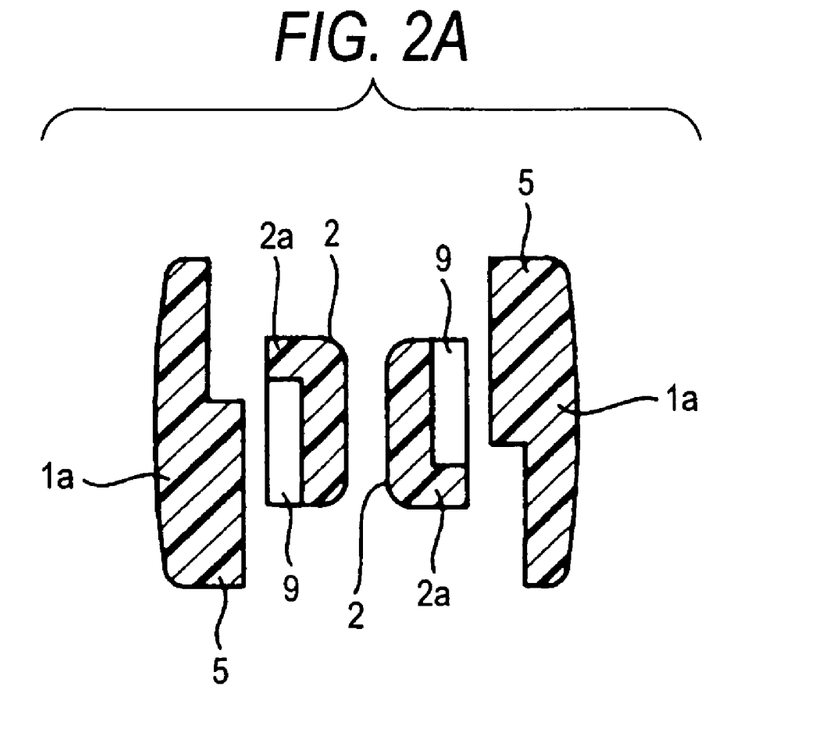
FIG. 2A is a section view taken along the A-A line shown in FIG. 1.
Figure 2B:
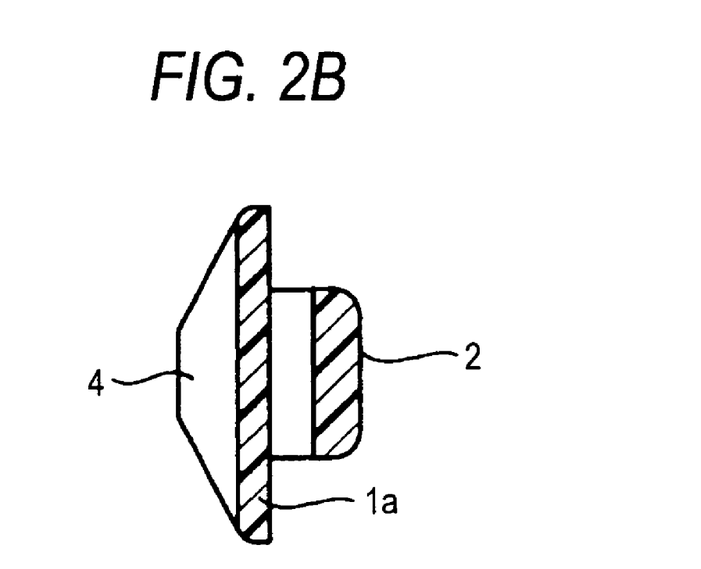
FIG. 2B is a section view taken along the B-B line shown in FIG. 1.

Also, the pair of elastic arms 2 employ the following structure: that is, on the upper surfaces of the elastic arms 2 which are continuous with the free end sides of the respective side walls 1a, there are formed two slanting guide portions 7; on the inner surfaces of the leading end portions of the elastic arms 2, there provided two engaging pawl portions 8 which can be engaged with engaging holes opened up in the boss portion of the trim and functioning as the engaging portions of the boss portion; and, in the outer surfaces of the leading end portions of the elastic arms 2 respectively facing their associated engaging pawl portions 8, there are formed two groove-shaped recessed portions 9 into which their associated projecting portions 5 formed in the respective side walls 1a can be fitted. Especially, referring to the formation of the recessed portions 9, as shown in FIGS. 2A and 2B, each recessed portion 9 is formed with a portion 2a left in the width direction of the elastic arm 2 and the thus left portions 2a are made to alternate each other. Therefore, the projecting portions 5, which correspond to the recessed portions 9, also alternate each other in the width direction of the side walls 1a.

Referring here to the relationship between the recessed portions 9 and projecting portions 5, when the base body 1 of the clip is inserted, together with the boss portion of the trim, into the mounting hole of the car body panel, there is not established a complete engagement state in which the lower surfaces of these partner elements are completely collided with each other as well as the leading ends of the projecting portions are completely collided with the bottom portions of the recessed portions 9; when the trim is fixed to the car body panel, the recessed portions 9 and projecting portions 5 overlap in part with each other; and, when an unexpected pull-out force is applied to the trim, or when removing the trim from the car body panel, there can be established a complete engagement state in which the lower surfaces of these partner elements are completely collided with each other as well as the leading ends of the projecting portions are completely collided with the bottom portions of the recessed portions 9. Also, the recessed portions 9 and projecting portions 5 are formed in the vicinity of the engaging pawl portions of the elastic arms 2 but they are spaced apart from the securing shoulders 3 of the base body 1 in the vertical direction.

Further, as regards the pair of securing shoulders 3, there is employed a structure in which, on the upper surface sides of the securing shoulders 3 to be secured to the hole edge of the mounting hole of the car body panel, there are formed tapered surface portions 10.

Figure 3:
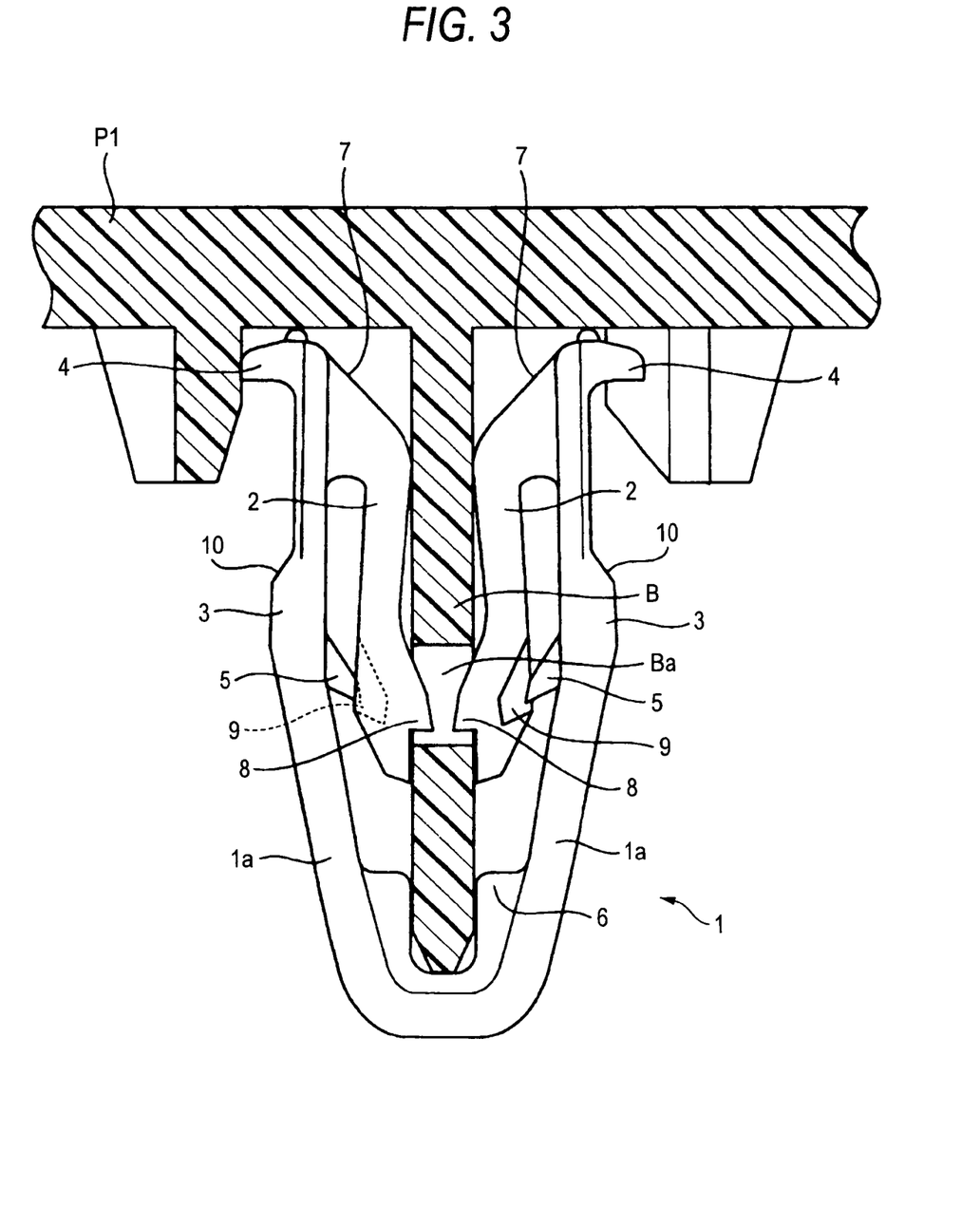
FIG. 3 is a section view of the main portions of the clip, showing a state where it is provisionally engaged with the boss portion of a trim.

Thus, when fixing a trim P1 to a car body panel P2 using the above-structured clip, as shown in FIG. 3, while pinching the side walls 1a of the base body 1 from both sides, the boss portion B of the trim P1 is inserted into the inside of the U-shaped base body 1 with the aid of the guidance of the guide portions 7. As a result of this, not only the leading end side of the boss portion B is supported onto the support portion 6 but also the engaging pawl portions 8 formed on the inner surfaces of the leading end portions of the pair of elastic arms 2 are engaged with the engaging hole Ba of the boss portion B from both sides, whereby the clip is provisionally engaged with the boss portion B of the trim P1. However, in this case, the engaging pawl portions 8 are in loose fit with the engaging holes Ba and the projecting portions 5 are respectively held in such a state where they respectively overlap their associated recessed portions 9 in part.

Figure 4:
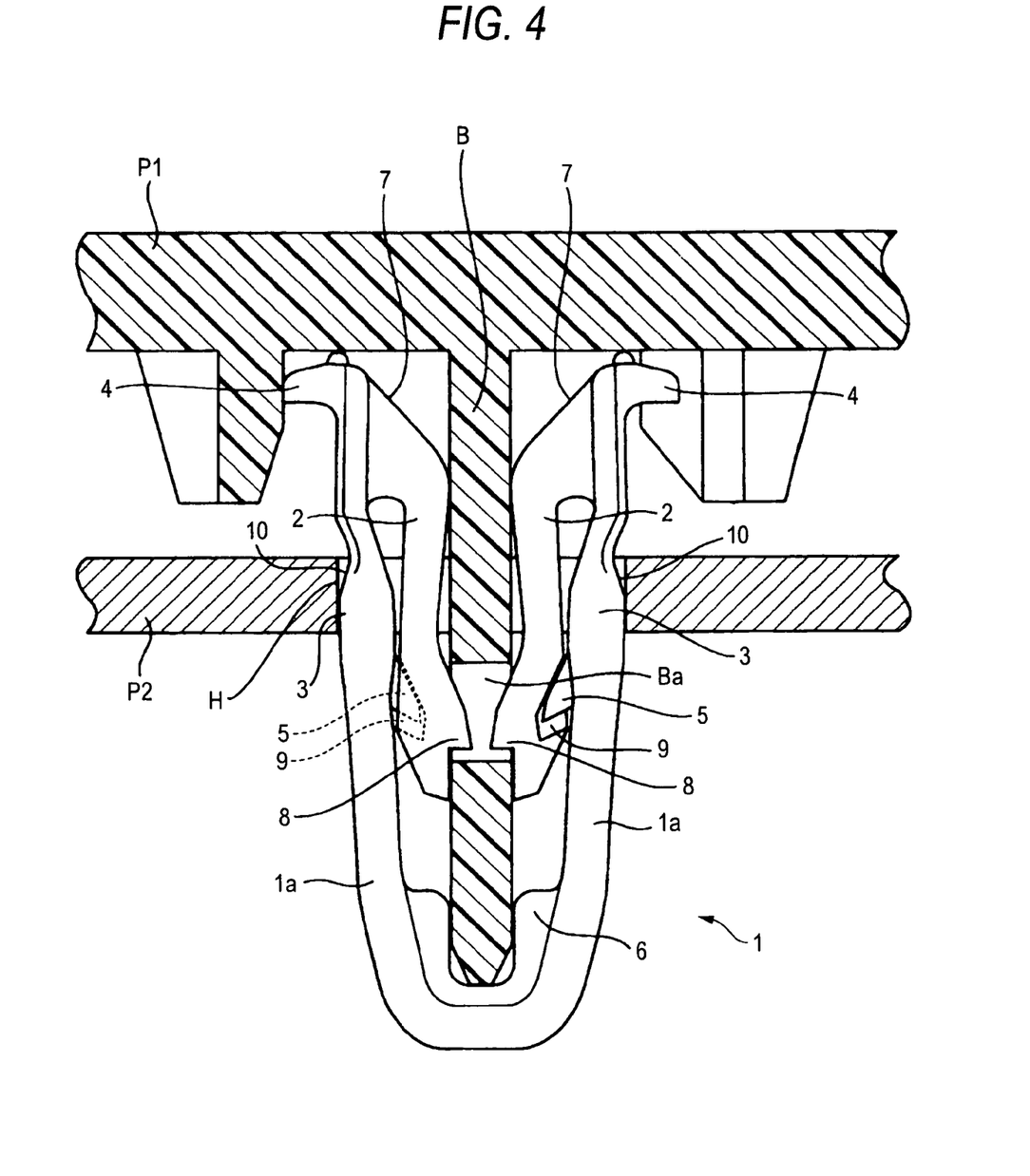
FIG. 4 is a section view of the main portions of the provisionally engaged clip, showing how to insert it into the mounting hole of a car body panel.

And, in this state, when the clip provisionally engaged with the boss portion B of the trim P1 is inserted into a mounting hole H which is previously opened up in the car body panel P2, as shown in FIG. 4, the side walls 1a of the base body 1 are moved through the mounting hole H while they are flexing inwardly due to the hole edges of the mounting hole H. In this case, since the projecting portions 5 of the side walls 1a also penetrate inside their corresponding recessed portions 9 of the elastic arms 2, the side walls 1a are able to move smoothly through the mounting hole H without their own flexure being restricted, thereby being able to reduce the inserting force of the clip greatly. By the way, in the process where the clip is moved through the mounting hole H of the car body panel P2, although the projecting portions 5 of the side walls 1a penetrate inside the recessed portions 9 of the elastic arms 2, as shown FIG. 4, the amount of overlapping between the recessed portions 9 and projecting portions 5 is secured to be equal to or greater than the amount of flexure of the side walls 1a generated until the securing shoulders 3 of the side walls 1a are contacted with the hole edge of the mounting hole H, thereby allowing the side walls 1a to easily flex inwardly.

Figure 5:
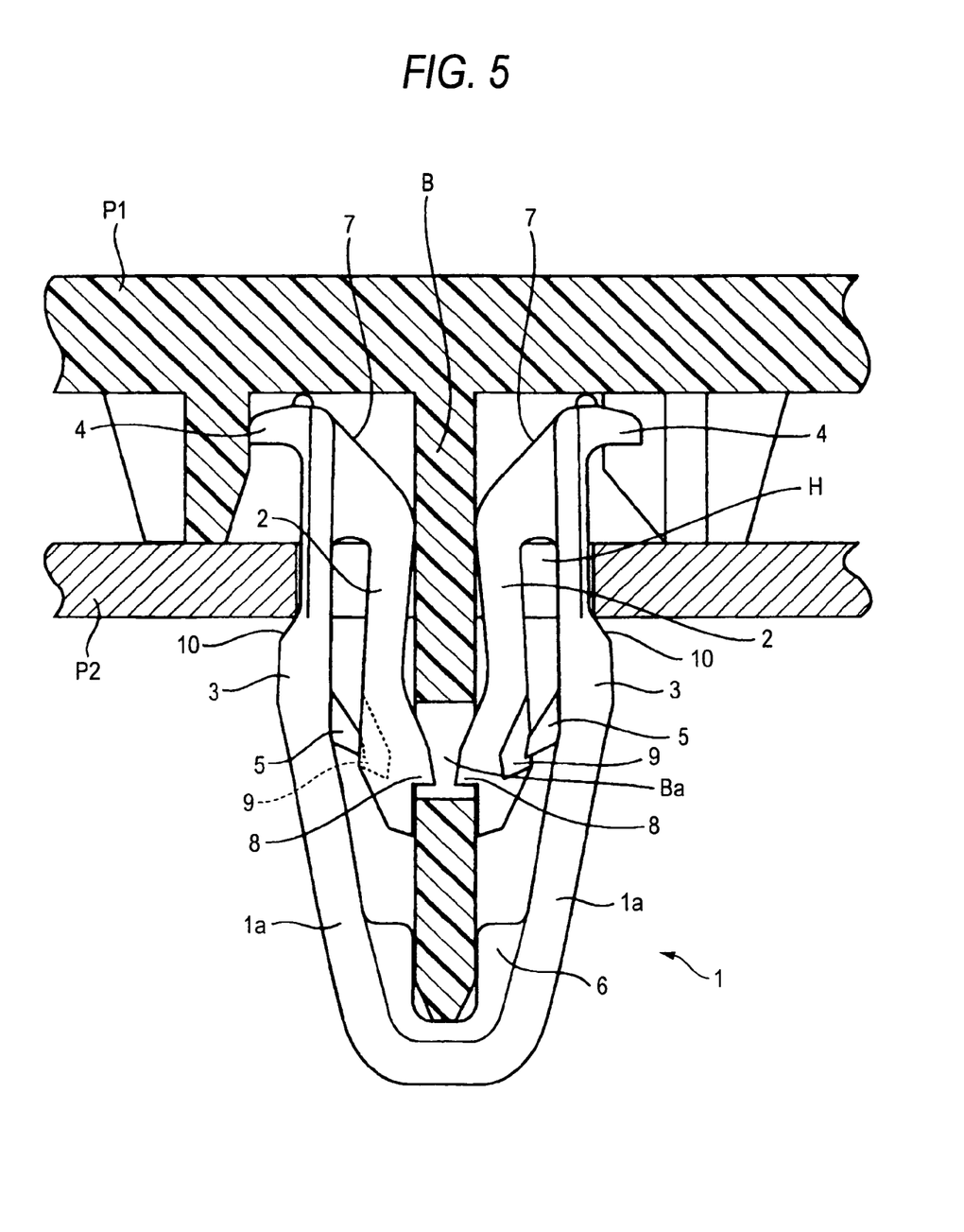
FIG. 5 is a section view of the main portions of the clip, showing a state where the trim is fixed to the car body panel.

And, finally, when the pair of shoulders 3 have passed through the mounting hole H of the car body panel P2, the side walls 1a of the base body 1 respectively return to their own initial shapes due to their own elasticity and, as shown in FIG. 5, the tapered surface portions 10 of the securing shoulders 3 are elastically secured to the hole edge of the mounting hole H, whereby the trim P1 can be fixed to the car body panel P2 at a single touch. By the way, in this fixed state, similarly to the above-mentioned provisional engaged state, the engaging pawl portions 8 are loosely fitted into the engaging hole Ba, and the projecting portions 5 are held in such a state where they respectively overlap their associated recessed portions 9 in part.

Figure 6:
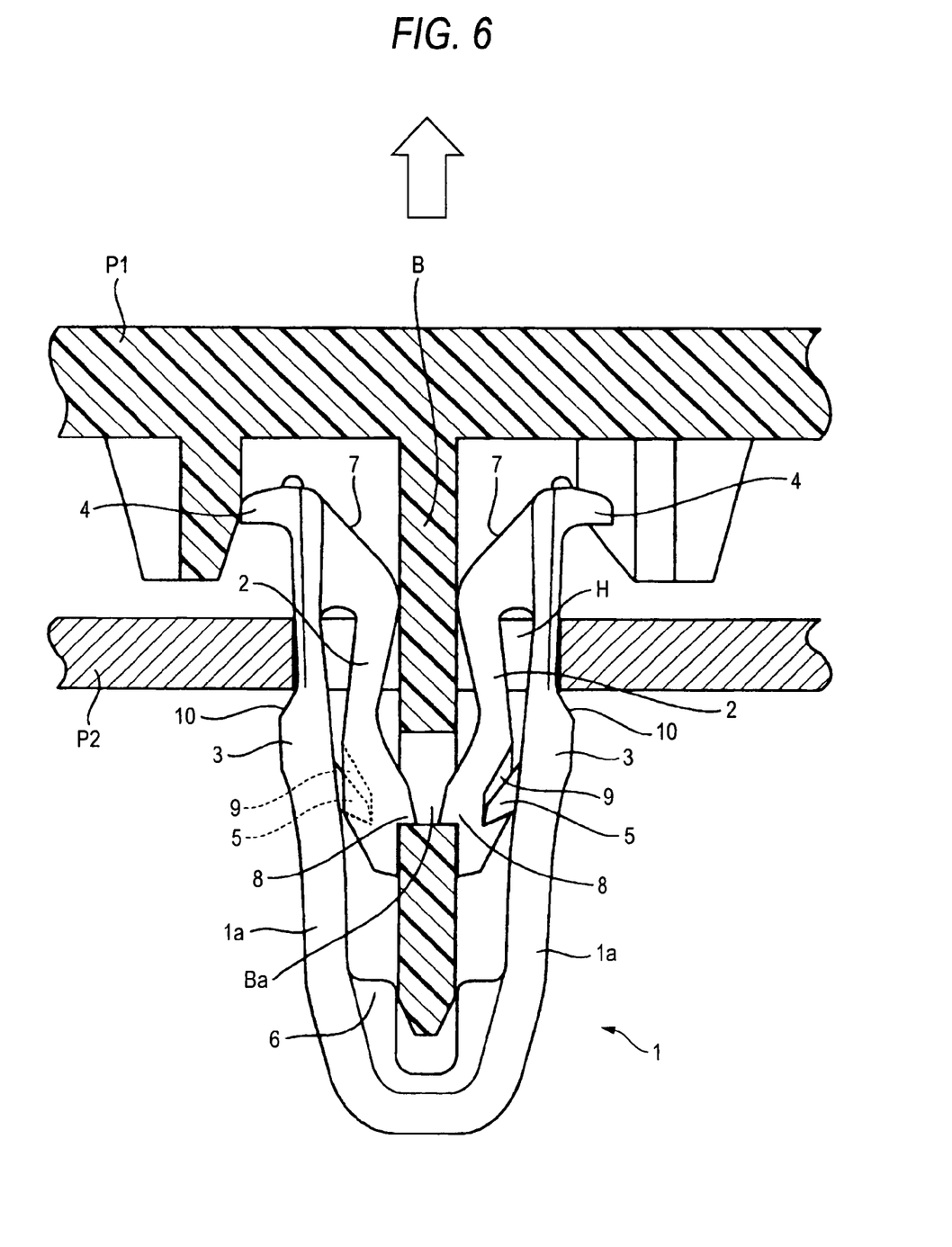
FIG. 6 is a section view of the main portions of the clip, showing a process for pulling out the boss portion of the trim from the mounting hole of the car body panel.

On the other hand, referring to an operation to remove the trim P1 from the car body panel P2 in this fixed state, when trying to pull out the boss portion B of the trim P1 from the mounting hole H of the car body panel P2, as shown in FIG. 6, the lower surface of the engaging hole Ba of the boss portion B is collided with the lower surfaces of the engaging pawl portions 8 of the respective elastic arms 2 to thereby deform the respective elastic arms 2 upwardly, resulting in a fit state where the lower surfaces of the recessed portions 9 and projecting portions 5 are collided with each other owing to such collision in these two portions, the clip itself is going to be pulled out together with the boss portion B. By the way, referring to the establishment of the fit state between the recessed portions 9 and projecting portions 5, as described above, the recessed portions and projecting portions 5 have previously overlapped each other in part; that is, this previous partial overlapping can serve as a guide to ensure that the recessed portions 9 and projecting portions 5 can be positively engaged or fitted with each other.

Although not shown specifically, when the securing shoulders 3 respectively having the tapered surface portions 10 move into the mounting hole H of the car body panel P2, the side walls 1a of the base body 1 are flexed inwardly and thus the inner surfaces of the side walls 1a are pressed against their associated elastic arms 2 to thereby strengthen the engagement state between the engaging hole Ba of the boss portion B and the engaging pawl portions 8 of the elastic arms 2; and, at the same time, the bottom portions of the recessed portions 9 and the leading ends of the projecting portions 5 are collided with each other, whereby the recessed portions 9 and projecting portions 5 are completely fitted or engaged with each other. Finally, while the clip remains mounted on the boss portion B of the trim P1, the boss portion B of the trim P1 can be removed from the car body panel P2.

Also, in this case, since the recessed portions 9 and projecting portions 5 are respectively disposed in the vicinity of the engaging pawl portions 8 of the elastic arms 2 to which the pull-out force is applied, there can be obtained a further stronger fit or engagement state between the recessed portions 9 and projecting portions 5. And, since the recessed portions 9 are formed such that the left portions 2a thereof alternate with each other, the fit or engagement state can be made uniform. This also makes it possible to positively hold the clip on the boss portion B of the trim P1. Further, since the securing shoulders 3 of the base body 1 and the recessed portions 9/projecting portions 5 are spaced from each other in the vertical direction, the base body 1 itself is easy to flex, which not only eliminates a fear that the shoulders 3 can be shaved off due to the hole edge of the mounting hole H, but also allows the re-use of the shoulders 3.

When an expected pull-out force is applied to the trim P1 held at a fixed state although the trim P1 is not removed from the car body panel P2, similarly to the above-mentioned FIG. 6, owing to the fit between the recessed portions 9 and projecting portions 5, the flexure of the side walls 1a of the base body 1 as well as the deformation of the elastic arms 2 are restricted to thereby be able to set the pull-out load at a high level. This can surely eliminate the possibility that the trim P1 can be removed from the car body panel P2 in error.

Figure 7:
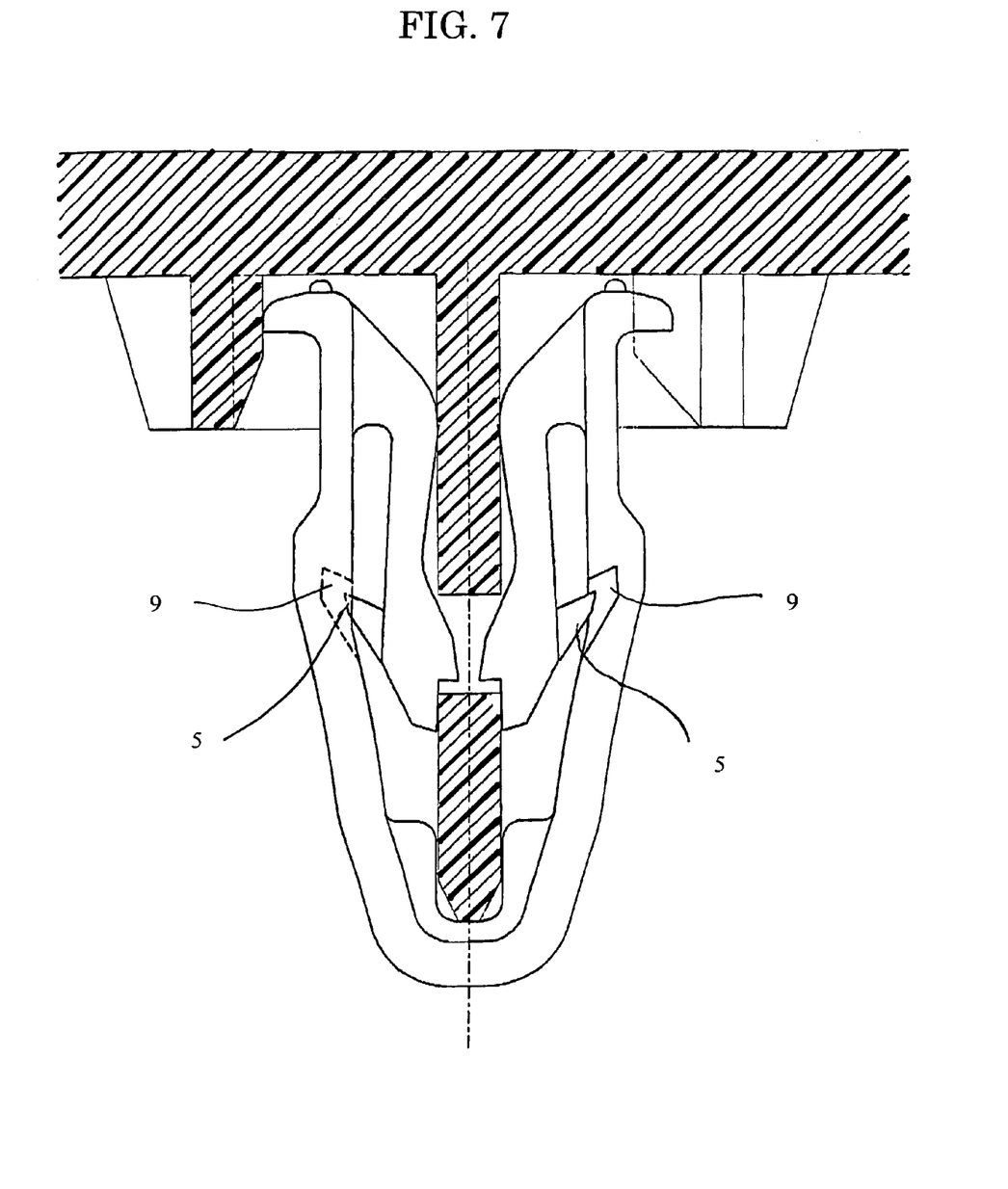
FIG. 7 shows a second embodiment of the invention.

In the above-mentioned embodiment, the projecting portions 5 are formed on the side walls 1a of the base body 1 and the recessed portions 9 are formed in the elastic arms 2. However, the invention is not limited to this but, reversely, according to the cases, as shown in FIG. 7, the recessed portions 9 may also be formed in the side walls 1a of the base body 1 and the projecting portions 5 may also be formed in the elastic arms 2. However, in either case, as shown in the accompanying figures, preferably, the lower surfaces of the respective portions 5 and 9 may be inclined in order that they can be positively fitted with each other.

According to the clip of the invention, when it is inserted into the mounting hole of a panel, the insertion force thereof can be reduced and, when it is pulled out from the mounting hole of the panel, it is not left in the mounting hole of the panel but it can be pulled out together with the boss portion of a trim. Therefore, the present clip can be very advantageously applied to a case where the trim or garnish of a car is fixed to a car body panel.

What is claimed is:

1. A clip for fixing a mounting part with a boss portion provided on and suspended perpendicularly from the back surface thereof to a panel with a mounting hole formed therein, the clip comprising:

a base body having a U-shaped section and including a pair of mutually opposed side walls;

a pair of elastic arms respectively extended from the inner surfaces of their associated side walls of the base;

a pair of securing shoulders respectively provided on and projected from the outer surfaces of their associated side walls of the base body, each securing shoulder having a tapered surface portion;

engaging pawl portions engageable with an engaging portion formed in the boss portion, the engaging pawl portions being formed in the inner surfaces of the leading end portions of the pair of elastic arms;

recessed portions provided in one of the inner surfaces of the side walls of the base body and the outer surfaces of the elastic arms corresponding to the inner surfaces of the side walls; and projecting portions provided in the other of the inner surfaces of the side walls of the base body and the outer surfaces of the elastic arms corresponding to the inner surfaces of the side walls, wherein:

when the base body is inserted into the mounting hole of the panel, the recessed portions and projecting portions are not to be engaged with each other; and when the base body is pulled out from the mounting hole of the panel, the recessed portions and projecting portions are to be engaged with each other.

2. The clip as set forth in claim 1, wherein
the recessed portions and projecting portions are respectively situated in the vicinity of the engaging pawl portions of the respective elastic arms.

3. The clip as set forth in claim 1, wherein
each of the recessed portions is formed such that a portion thereof is left in the width direction of the side wall of the base body or the elastic arm.

4. The clip as set forth in claim 3, wherein
the respective recessed portions are formed such that the left portions thereof alternate each other.

5. The clip as set forth in claim 1, wherein the recessed portions and projecting portions overlap each other in part in a state where the mounting part is fixed to the panel.

* * * * *